United States Patent Office 3,070,504
Patented Dec. 25, 1962

3,070,504
LOWER ALKYL ALKENYL ETHER ADDUCTS OF Δ¹⁶-20-KETOSTEROIDS AND PROCESS THEREFOR
Donald P. Cameron, New London, Conn., assignor to Chas. Pfizer & Co., Inc., New York, N.Y., a corporation of Delaware
No Drawing. Filed Apr. 5, 1960, Ser. No. 19,995
9 Claims. (Cl. 167—65)

This invention relates to new and useful steroid ring compounds, as well as to the method for preparing such compounds. More particularly, it is concerned with the novel heterocyclic addition products which are derived by condensing various Δ¹⁶-20-ketosteroids with certain lower alkyl alkenyl ethers. There is also included within the purview of this invention various pharmaceutical compositions which have at least one of the herein described adducts as their essential active ingredient.

The compounds which come within the scope of the present invention are selected from the class of steroid ring compounds corresponding to the general structural formulae:

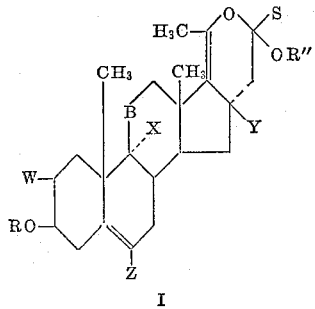

I

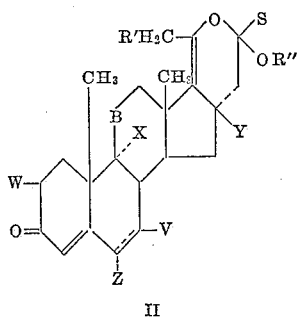

II and the Δ¹-derivatives thereof, wherein B is a member of the group consisting of methylene, hydroxymethylene and carbonyl, W is a member of the group consisting of hydrogen and methyl, X is a member of the group consisting of hydrogen, fluorine and chlorine, Y is a member of the group consisting of hydrogen and methyl, Z is a member of the group consisting of hydrogen, hydroxyl, acetoxyl, fluorine and methyl, V is a member of the group consisting of hydrogen and acetylthio, S is a member of the group consisting of hydrogen and methyl, R is a member of the group consisting of hydrogen and an acyl moiety derived from a hydrocarbon carboxylic acid containing up to ten carbon atoms, R' is a member of the group consisting of hydrogen, methyl, hydroxyl and acyloxyl wherein the acyl moiety is derived from a hydrocarbon carboxylic acid containing up to ten carbon atoms, and R'' is alkyl having from one to three carbon atoms; and the Δ⁹⁽¹¹⁾- and 9β,11β-epoxide derivatives of those compounds wherein X is hydrogen and B is a member of the group consisting of methylene and hydroxymethylene. Typical examples of these heterocyclic addition products include the lower alkyl vinyl ether adducts of such compounds as Δ¹⁶-progesterone, 9α-fluoro-Δ¹⁶-progesterone, 16-methyl-Δ⁵,¹⁶-pregnadiene-3β-ol-20-one 3-acetate, Δ¹⁶-prednisolone 21-acetate, and the like.

In accordance with the present invention, the aforementioned adducts possess interesting pharmaceutical properties which render them useful as synthetic medicinals. More particularly, those compounds which are of type I exhibit utility as progestational agents, i.e., they behave as sex hormones which exhibit progestin-like activity, while the remaining compounds, viz. those of type II, are useful as anti-inflammatory agents and/or as anti-aldosterones. In the latter connection, they serve to block the action of aldosterone, which is a potent steroid derived from the adrenal glands that regulates electrolyte metabolism in man. Moreover, all the compounds of this invention are additionally useful as valuable intermediates for the production of still other physiologically active novel compounds such as those which are of the type illustrated below:

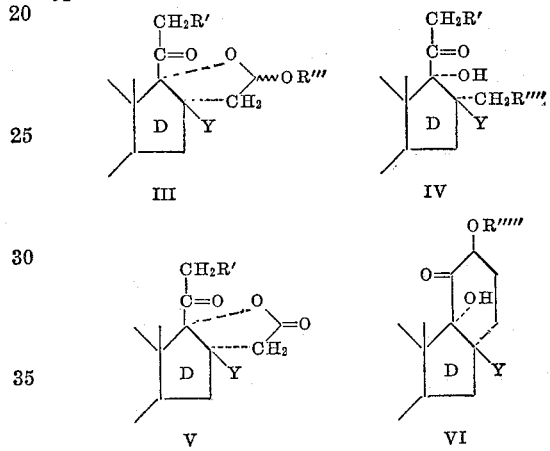

wherein the remainder of the ring is as previously defined, as are Y and R', while R''' is lower alkyl and preferably alkyl having from one to three carbon atoms, R'''' is a member of the group consisting of methyl, hydroxy-methyl, carboxaldehyde, carboxyl and carbalkoxyl, and R''''' is either hydrogen or acetyl. These novel end products are valuable corticosteroids, and they can easily be derived from the aforementioned adducts via various conventional routes hereinafter indicated.

In accordance with the process for preparing the compounds of the present invention, an appropriately substituted Δ¹⁶-20-ketosteroid substrate, wherein any free hydroxyl groups present at either the 3-, 11- or 21-positions are preferably first protected by means of esterification, is contacted with the lower alkyl alkenyl ether of choice in accordance with a modification of the accepted Diels-Alder technique [e.g., see M. C. Kloetzel in Organic Reactions, by R. Adams, vol. IV, p. 1, J. Wiley and Sons, Inc., New York (1948)], wherein elevated temperatures and pressures are employed and the reaction is preferably conducted in an inert atmosphere such as that of nitrogen or argon. In general, the process of this invention is ordinarily carried out at a temperature that is in the range of from about 150° C. to about 250° C. for a period of from about one to about twenty hours and at a pressure that is at least about 200 p.s.i. of nitrogen. However, it is preferable to maintain the temperature within the 150–200° C. range when employing the 21-acetoxy compounds in order to ensure that no decomposition takes place. If desired, the reaction is conducted in the presence of a reaction-inert organic solvent such as an aromatic hydrocarbon like benzene, toluene, xylene and so forth, but in practice it is most convenient to employ an excess of the lower alkyl vinyl ether reagent for just such purposes. Suitable Δ¹⁶-20-ketosteroids for use in this connection include those compounds which have the following general structural formulae:

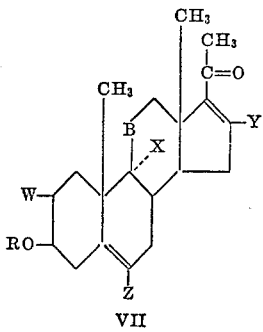

VII and

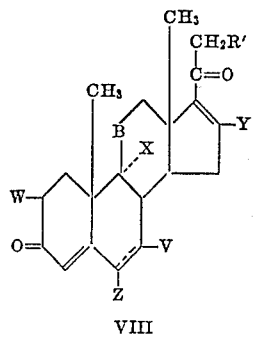

VIII and the Δ¹-derivatives of all these compounds wherein B, W, X, Y, Z, V, R and R' are all as previously defined, as well as the 9β,11β-epoxy derivatives of those compounds wherein X is hydrogen and B is methylene. Among the typical examples of Δ¹⁶-20-ketosteroid dienophiles which have been successfully employed in the process of this invention are such previously mentioned compounds as Δ¹⁶-progesterone, Δ¹⁶-desoxycorticosterone acetate, Δ⁵,¹⁶-pregnadiene-3β-ol-20-one 3-acetate, 16-methyl-Δ¹⁶-pregnadiene-3β-ol-20-one 3-acetate, and the like.

The starting materials employed in this process as outlined above are either known compounds or else they can easily be prepared by those skilled in the art from readily available starting materials by means of standard organic or biochemical techniques. For instance, the unsaturated double bond can be introduced into a steroid nucleus at the 16,17-positions of the molecule by treating the corresponding 16α-hydroxy compound with aluminum tertiary-butoxide and base in accordance with the procedure of D. Perlman et al. as described in the Journal of the American Chemical Society, vol. 74, p. 2126 (1952). However, in many cases the 16,17-double bond is already present in the molecule as Δ¹⁶-steroids represent a wide class of steroid starting materials of natural origin. The introduction of the double bond at the 1,2-positions can be best effected microbiologically by means of a dehydrogenating microorganism of the genus Protaminobacter as described by G. M. Shull in U.S. Patent No. 2,776,927 (January 8, 1957).

Regarding the substituent groups on the starting steroid molecule, the methyl group at the 2-position is introduced via the method reported by J. S. Hogg et al. in the Journal of the American Chemical Society, vol. 77, p. 6401 (1955), which involves the use of methyl iodide and potassium carbonate on the corresponding 2-ethoxyoxalyl compounds. A somewhat different approach is employed to introduce the 16-methyl group, viz., treatment of a Δ¹⁶-pregnene with diazomethane followed by pyrolysis of the resulting adduct in accordance with the procedure described by D. Taub et al. in the Journal of the American Chemical Society, vol. 80, p. 4435 (1958). The 6β-hydroxyl group is preferably introduced by incubating the steroid substrate with *Rhizopus arrhizus* in accordance with any one of the pertinent procedures mentioned by G. M. Shull in his review article entitled, "Transformation of Steroids by Molds," as reported in the Transactions of the New York Academy of Sciences, Ser. II, vol. 19, No. 2, pages 149–152 (1958). The 11α- or 11β-hydroxyl group is preferably introduced via the microbiological method described by G. M. Shull in U.S. Patent No. 2,830,937 (April 15, 1958), using the certain strains of the genus Stachylidium as the oxidizing organism. The 11β-hydroxysteroids so prepared can then be dehydrated with p-toluenesulfonic acid to yield the corresponding Δ⁴,⁹⁽¹¹⁾-compounds, which on treatment with hypochlorous acid affords an epoxide ring across the 9,11-positions. Subsequent treatment of the latter types with either hydrogen fluoride or hydrogen chloride yields the desired 9α-halo-11β-hydroxy-steroids, which can then be oxidized to the corresponding 11-keto compounds. The fluorine atom at the 6-position of the molecule is introduced by a somewhat similar approach as is more fully described by P. F. Beal in U.S. Patent No. 2,838,502 (June 10, 1958). The 7-acetylthio derivatives are synthesized from the corresponding Δ⁶-compounds in accordance with conventional methods such as that employed by J. A. Cella et al. as disclosed at the 135th National Meeting of the American Chemical Society in Boston, Mass. (April 1959), while the 21-methyl compounds are prepared by the method described by E. J. Agnello et al. in U.S. Patent No. 2,915,434 (December 1, 1959).

In accordance with a more specific embodiment of the process of this invention, one part by weight of a Δ¹⁶-20-ketosteroid of the aforementioned type is dissolved in about thirty parts by volume of a lower alkyl alkenyl ether selected from the group consisting of lower alkyl vinyl ethers and lower alkyl isopropenyl ethers or at least in a sufficient amount of said ether to dissolve the steroid dienophile, the excess amount of reagent functioning as a solvent. Preferred lower alkyl alkenyl ethers in this connection include such compounds as methyl vinyl ether, ethyl vinyl ether, isopropy vinyl ether, ethyl isopropenyl ether, and the like. The reagent-solvent should also contain a small amount of an antioxidant such as hydroquinone, although this is not absolutely necessary. The reaction is most desirably carried out in a pressure bomb pre-flushed with an inert gas, such as nitrogen or argon as aforesaid, under elevated pressure (say, for example, at about 400 p.s.i. of nitrogen pressure), although any pressure in the range of from about 200 p.s.i. to about 1080 p.s.i. of nitrogen is usually most satisfactory for such purposes. The reaction mixture is then rapidly heated to a temperature within the aforesaid range of 150–250° C. or 150–200° C., as the case may be, and held at that point for the desired time period previously indicated. The adduct product so obtained is then recovered from the spent reaction mixture via concentration of same to a volume which is at least about one-fourth of its original volume or until precipitation of the desired product from said solution first occurs.

As previously indicated, the adducts of the present invention are readily adapted to therapeutic use either as progestational agents or as glucocorticoids or as anti-aldosterone compounds depending on whether their structure is of type I or type II and depending upon whether or not there is an oxygen function at the 11-position of the molecule. In general, they are administered at dosage levels which are approximately of the same order of magnitude as those employed in the case of other known agents recommended for just such purposes, like progesterone, hydrocortisone and various steroid-17-spirolactones, respectively. Moreover, they accomplish their valuable therapeutic effects without causing any harmful or deleterious physiological side reactions to occur. These aforementioned biologically active compounds may either be administered alone or in combination with pharmaceutically acceptable carriers and such administration can be carried out via the oral or parenteral routes.

For purposes of oral administration, the compounds may be administered in the form of tablets or capsules containing excipients such as starch or milk sugar. Alternatively, it is also possible to employ aqueous suspensions and elixirs which can be sweetened or flavored as desired. For purposes of parenteral administration, intramuscular and subcutaneous dosage forms may be prepared in accordance with standard pharmaceutical practice. Additionally, it is also possible to administer the corticosteroid compounds topically when treating inflammatory conditions of the skin.

Regarding the use of these adducts as intermediates for the production of novel steroid types III–VI in somewhat more detail, the pyran ring of the desired heterocyclic addition product can be cleaved via acid hydrolysis to afford the corresponding open chain 16α-formylmethyl compound which on treatment with silver oxide yields the closely related 16α-carboxymethyl-steroid. Treatment of the latter intermediate with a dehydrating agent such as benzenesulfonic acid or p-toluenesulfonic acid converts the $\Delta^{17(20)}$-20-enol form of this compound to the corresponding 17,20-enol lactone which happens to be an anti-aldosterone type compound. Subsequent treatment of the latter compound with either perbenzoic acid or osmium tetroxide followed by acid hydrolysis affords the desired corticosteroid (type IV) where R''' is COOH. The entire series of reactions as outlined above is illustrated below by means of the following set of equations wherein only the pertinent portions of the steroid molecule are shown and R' has the same meaning as hereinbefore stated:

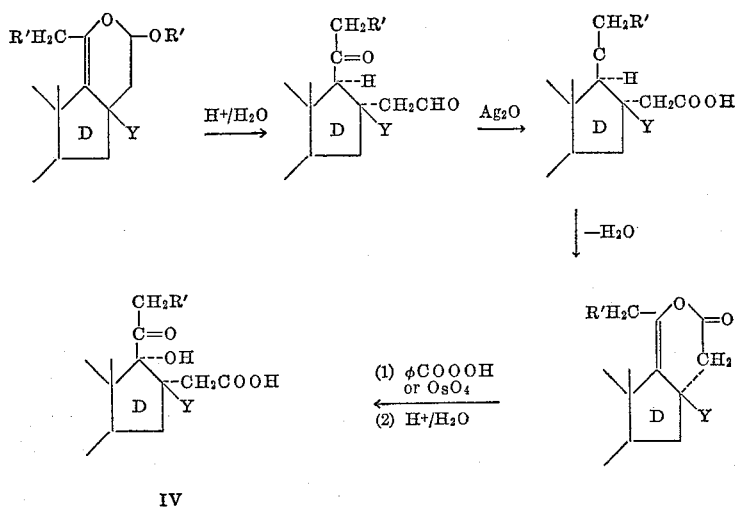

Alternatively, a different and somewhat more versatile route can be employed to achieve the same result in addition to yielding compounds of types III and V. This second series of reactions is illustrated below by the following set of equations:

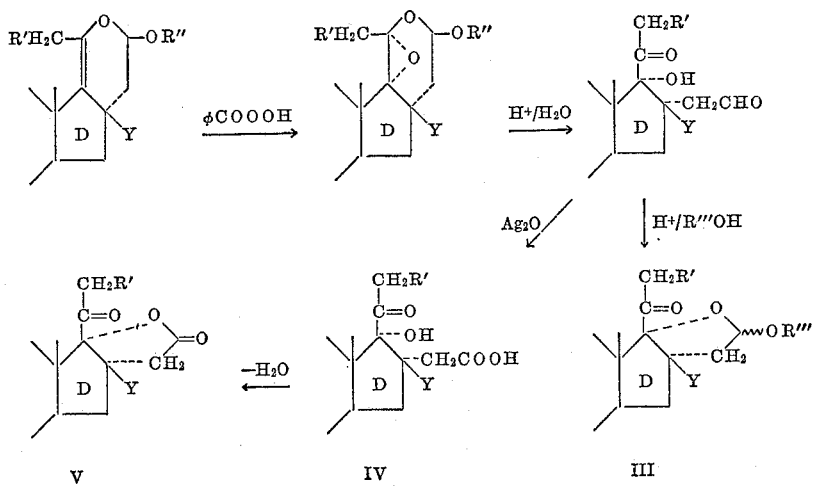

The above type series of reactions have already been individually encountered in the first set of equations with the exception of the alcoholysis step used to produce compounds of type III and inasmuch as the latter step is a conventional one, it is certainly well-known to those skilled in the art. Finally, the open chain 16α-formylmethyl prepared in the first series of reactions is the starting point for the synthesis of compounds of type VI as is shown by the following series of equations:

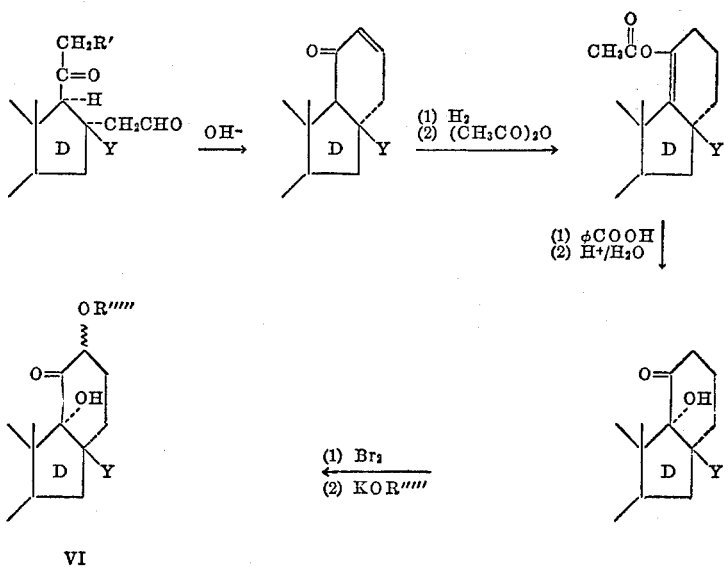

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A solution consisting of 5 g. of $\Delta^{5,16}$-pregnadiene-3$\beta$-ol-20-one 3-acetate dissolved in 150 ml. of ethyl vinyl ether containing 1 mg. of hydroquinone is placed in a pressure bomb pre-flushed with nitrogen at room temperature and atmospheric pressure. The nitrogen pressure is then raised to 400 p.s.i., and the bomb and its contents are rapidly heated to a temperature of 230° C. and held at that point for a period of two hours (at which point the nitrogen pressure becomes 940–1000 p.s.i.). Upon completion of this step, the reaction mixture is cooled to room temperature and the pressure of the system readjusted to atmospheric conditions by means of an air vent. The resulting solution is then concentrated under reduced pressure at 35° C. to a volume of about 15–35 ml., at which point the desired product precipitates from the concentrate. The crystalline precipitate is then collected by means of filtration and washed with cold acetonitrile. Recrystallization of this product from the latter solvent affords the pure adduct in a 30% yield. The heterocyclic addition compound formed in this manner has the following characteristic properties: M.P. 196–197° C.; $[\alpha]_D^{26°}$ —73.6° (c., 2%; dioxane);

$\lambda_{max.}^{CH_2Cl_2}$ at 5.79; 5.91 and 8.06$\mu$; $\lambda_{max.}^{KBr}$ at 5.77, 5.89 and 8.0$\mu$

*Analysis.*—Calcd. for $C_{27}H_{40}O_4$: C, 75.66; H, 9.41. Found: C, 75.88; H, 9.66.

*Example II*

The procedure described in Example I is followed except that the starting material employed is 16-methyl-$\Delta^{5,16}$-pregnadiene-3$\beta$-ol-20-one 3-acetate, and the reaction is conducted at 215–220° C. for a period of 19 hours. In this manner, there is obtained a 45% yield of pure adduct, i.e., the heterocyclic addition compound formed by reacting 16-methyl-$\Delta^{5,16}$-pregnadiene-3$\beta$-ol-20-one 3-acetate with ethyl vinyl ether, which has the following characteristic properties: M.P. 189–194° C.; $[\alpha]_D^{26°}$ —8.9° (c., 2.5%; CHCl$_3$);

$\lambda_{max.}^{CH_2Cl_2}$ at 5.76, 5.86 and 8.03$\mu$

*Analysis.*—Calcd. for $C_{28}H_{42}O_4$: C, 75.98; H, 9.56. Found: C, 75.62; H, 9.62.

*Example III*

The procedure described in Example I is followed except that $\Delta^{16}$-progesterone is the starting material employed, and the reaction is conducted at a temperature of 200° C. for a period of 16 hours. In this manner, there is obtained the corresponding adduct, i.e., the heterocyclic addition compound formed by reacting $\Delta^{16}$-progesterone with ethyl vinyl ether, which has the following characteristic properties: M.P. 162–163° C.;

$\lambda_{max.}^{MeOH}$ at 241 mu ($E_{1\ cm.}^{1\%}$=442); $\lambda_{max.}^{CH_2Cl_2}$ at 5.90, 6.0 and 6.19$\mu$ $\lambda_{max.}^{KBr}$ at 5.90, 6.0 and 6.17$\mu$

*Analysis.*—Calcd. for $C_{25}H_{36}O_3$: C, 78.08; H, 9.44. Found: C, 78.04; H, 9.29.

*Example IV*

The procedure described in Example I is followed except that $\Delta^{16}$-desoxycorticosterone acetate is the starting material employed, and the reaction is conducted at 200° C. for seven hours. In this manner, there is obtained the corresponding adduct, i.e., the heterocyclic addition compound formed by reacting $\Delta^{16}$-desoxycorticosterone acetate with ethyl vinyl ether, which has the following characteristic properties: M.P. 165.4–167.8° C.;

$\lambda_{max.}^{MeOH}$ at 241 mu ($E_{1\ cm.}^{1\%}$=368); $\lambda_{max.}^{KBr}$ at 5.79, 6.16 and 8.10$\mu$

*Example V*

Other compounds which fall within the purview of the present invention form a large but yet determinable number. The following list of $\Delta^{16}$-20-ketosteroids which form adducts with ethyl vinyl ether is given to avoid unnecessary repetition of experimental details. The procedure employed to prepare them is essentially that of Example I except that the temperature at which the reaction is conducted is kept below 200° C. in the ease of the 21-acetoxy compounds.

$\Delta^{16}$-corticosterone 21-acetate
$\Delta^{1,16}$-corticosterone 21-acetate
2-methyl-$\Delta^{1,16}$-corticosterone 21-acetate
2-methyl-$\Delta^{5,16}$-pregnadiene-3$\beta$-ol-20-one 3-acetate
6-fluoro-16-methyl-$\Delta^{5,16}$-pregnadiene-3$\beta$-ol-20-one 3-acetate
9$\alpha$-fluoro-$\Delta^{16}$-progesterone
9$\alpha$-fluoro-$\Delta^{1,16}$-corticosterone 21-acetate
6-methyl-$\Delta^{5,16}$-pregnadiene-3$\beta$-ol-20-one 3-acetate
6$\alpha$-fluoro-$\Delta^{16}$-corticosterone 21-acetate
$\Delta^{9(11),16}$-desoxycorticosterone acetate
9$\beta$11$\beta$-oxido-$\Delta^{16}$-progesterone
7-acetylthio-$\Delta^{16}$-progesterone
21-methyl-$\Delta^{16}$-corticosterone
6$\beta$-hydroxy-$\Delta^{16}$-progesterone

*Example VI*

The procedures followed in the previous five examples (I–V) are repeated except that other lower alkyl ethers are employed in lieu of ethyl vinyl ether. For instance $\Delta^{5,16}$-pregnadiene-3$\beta$-ol-20-one 3-acetate and methyl vinyl ether react in accordance with the procedure of Example I to afford the corresponding adduct. In like manner, $\Delta^{1,16}$-3-hydroxycorticosterone 3-acetate and n-propyl vinyl ether react in accordance with the procedure of Example II to afford the corresponding adduct; $\Delta^{16}$-progesterone and ethyl isopropenyl ether react in accordance with the procedure of Example III to afford the corresponding adduct; $\Delta^{16}$-desoxycorticosterone acetate and methyl vinyl ether react in accordance with the procedure of Example IV to afford the corresponding adduct; 9$\alpha$-fluoro-$\Delta^{16}$-progesterone and isopropyl vinyl ether react in accordance with the procedure of Example III to afford the corresponding adduct; and $\Delta^{5,16}$-pregnadiene-3$\beta$-ol-20-one 3-acetate and methyl isopropenyl ether react in accordance with the procedure of Example I to afford the corresponding adduct.

*Example VII*

The 3-acetates of compound type I and the 21-acetates of compound type II prepared in the foregoing examples are all converted to the corresponding free alcohols by alkaline hydrolysis using conventional procedures. In this manner, the ethyl vinyl ether adduct of $\Delta^{5,16}$-pregnadiene-3$\beta$-ol-20-one 3-acetate is converted to the ethyl vinyl ether adduct of $\Delta^{5,16}$-pregnadiene-3$\beta$-ol-20-one, while the methyl vinyl ether adduct of $\Delta^{16}$-desoxycorticosterone 21-acetate is converted to the methyl vinyl ether adduct of $\Delta^{16}$-desoxycorticosterone.

*Example VIII*

A variety of 3- and 21-esters of the free alcohols prepared as described in Example VII other than the previously reported 3- and 21-acetates are each prepared in accordance with conventional esterification procedures. The compounds prepared include the 3- and 21-formates, trimethylacetates, propionates, n-butyrates, hexanoates, 2-ethylhexanoates, octanoates, cyclopentylpropionates, decanoates, hemisuccinates, benzoates, etc. In this connection, it is to be noted that the acid esters of dicarboxylic acids, such as the hemisuccinate, have a further advantage in that alkali metal and alkaline-earth metal salts can be prepared from them by treatment with molar proportions of a base such as sodium or potassium bicarbonate or barium hydroxide. These salts are water soluble, an advantage not possessed by the free alcohols themselves or by ordinary esters thereof.

What is claimed is:
1. A compound selected from the group consisting of those having the general structural formulae:

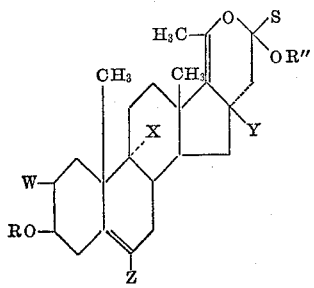

and

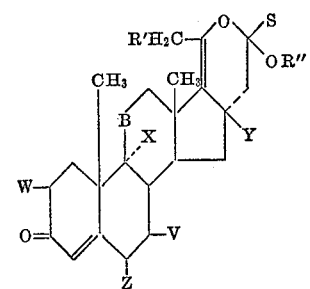

and the corresponding $\Delta^1$-derivatives of the second of these, wherein B is a member of the group consisting of methylene and hydroxymethylene, W is a member of the group consisting of hydrogen and methyl, X is a member of the group consisting of hydrogen, fluorine and chlorine, Y is a member of the group consisting of hydrogen and methyl, Z is a member of the group consisting of hydrogen, hydroxyl, acetoxyl, fluorine and methyl, V is a member of the group consisting of hydrogen and acetylthio, S is a member of the group consisting of hydrogen and methyl, R is a member of the group consisting of hydrogen and an acyl moiety derived from a hydrocarbon carboxylic acid containing up to ten carbon atoms, R' is a member of the group consisting of hydrogen, methyl, hydroxyl and acyloxyl wherein the acyl moiety is derived from a hydrocarbon carboxylic acid containing up to ten carbon atoms, and R'' is alkyl having from one to three carbon atoms; and the corresponding $\Delta^{9(11)}$- and 9$\beta$,11$\beta$-epoxide derivatives of those compounds wherein X is hydrogen and B is a member of the group consisting of methylene and hydroxymethylene.

2. A pharmaceutical composition comprising a compound as claimed in claim 1 and a pharmaceutically acceptable carrier.

3. The ethyl vinyl ether adduct of $\Delta^{16}$-progesterone.

4. The ethyl vinyl ether adduct of $\Delta^{5,16}$-pregnadiene-3$\beta$-ol-20-one 3-acetate.

5. The methyl vinyl ether adduct of $\Delta^{16}$-desoxycorticosterone 21-acetate.

6. The ethyl vinyl ether adduct of $\Delta^{16}$-desoxycorticosterone 21-acetate.

7. The isopropyl vinyl ether adduct of 9$\alpha$-fluoro-$\Delta^{16}$-progesterone.

8. The methyl isopropenyl ether adduct of $\Delta^{5,16}$-pregnadiene-3$\beta$-ol-20-one 3-acetate.

9. The process which comprises contacting a $\Delta^{16}$-20-ketosteroid in an inert atmosphere with at least an equimolar amount of a lower alkyl alkenyl ether selected from the group consisting of lower alkyl vinyl ethers and lower alkyl isopropenyl ethers at a temperature that is in the range of from about 150° C. to about 250° C. for from about one to about twenty hours under a moderately elevated pressure that is at least about 200 p.s.i. of nitrogen.

No references cited.